United States Patent
Dean

[11] 4,014,228
[45] Mar. 29, 1977

[54] METHOD AND APPARATUS FOR TRIMMING CYLINDRICAL ARTICLES

[75] Inventor: Geoffrey J. Dean, Denver, Colo.

[73] Assignee: Ball Corporation, Muncie, Ind.

[22] Filed: Sept. 10, 1975

[21] Appl. No.: 612,159

[52] U.S. Cl. .................................. 82/47; 82/53; 82/85; 82/101

[51] Int. Cl.² .................. B23B 1/00; B23B 37/00; B23B 3/04

[58] Field of Search ............ 82/46, 47, 53, 54, 85, 82/101

[56] References Cited

UNITED STATES PATENTS

| 2,702,597 | 2/1955 | Wickwire et al. | 82/54 |
|---|---|---|---|
| 3,400,620 | 9/1968 | Armbruster et al. | 82/85 |
| 3,481,232 | 2/1969 | Yann | 82/85 |
| 3,756,103 | 9/1973 | Cvacho et al. | 82/47 |
| 3,875,833 | 8/1975 | Kannegiesser | 82/85 |

*Primary Examiner*—Harrison L. Hinson
*Attorney, Agent, or Firm*—O'Rourke, Harris & Hill

[57] ABSTRACT

Method and apparatus for trimming cylindrical articles, particularly can bodies, to a predetermined longitudinal length by sequentially feeding such cylindrical articles into carriage pockets rotating around a main shaft synchronously with an axially aligned plunger at one end of each carriage pocket and a similarly aligned mandrel at the other end of the carriage pocket. At predetermined positions, the plunger moves into the aligned carriage pocket and pushes a cylindrical article therein onto an aligned mandrel which is rotated around its own axis as well as around the main shaft. As the mandrel rotates, a fixed arcuate blade which cooperates with a cutting edge defined in the mandrel is engaged to shear an annulus portion from the end of the cylindrical article thereby trimming the cylindrical article to a predetermined and repeatable length. Upon severing of the annulus, a fixed cutter blade engages the annulus to transversely cut the annulus into an open ring. Thereafter, the open ring is rolled, straightened and deposited as a strip in a chamber defined adjacent each mandrel with the severed strip being carried to a waste disposal position as the mandrel rotates around the main shaft. The trimmed cylindrical body is removed from the mandrel for further processing and the plunger retracted from the carriage to permit insertion of yet another untrimmed cylindrical article into the carriage device.

22 Claims, 7 Drawing Figures

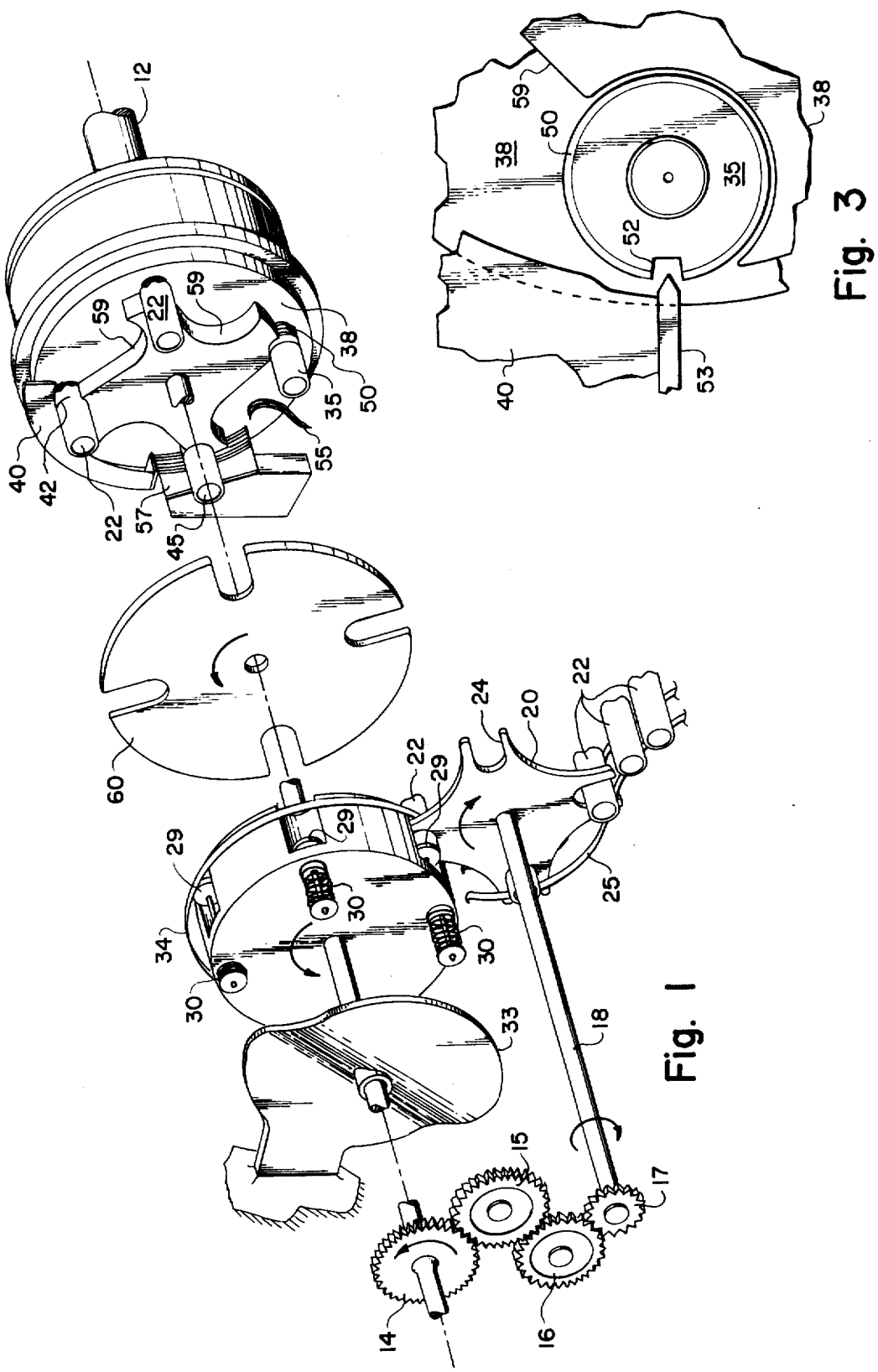

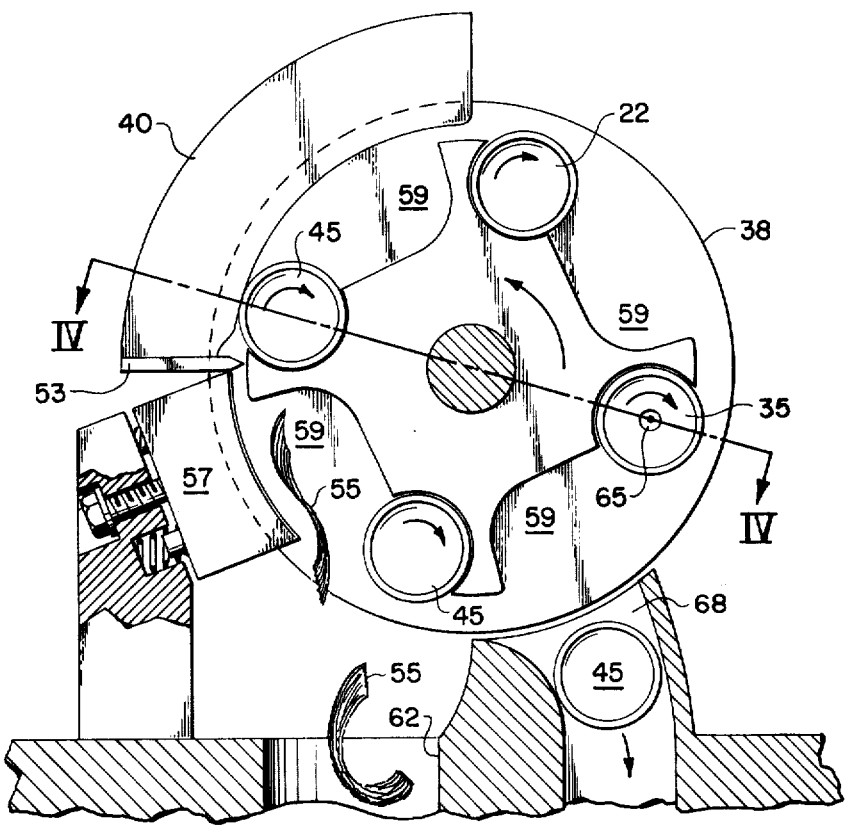
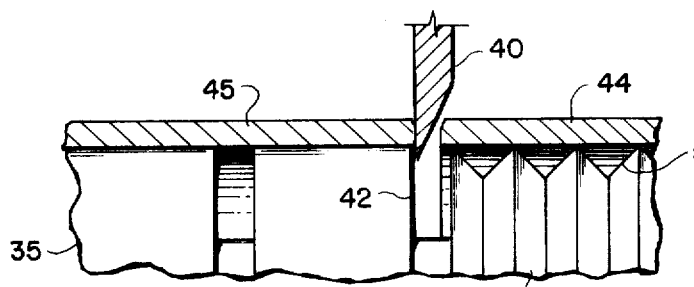
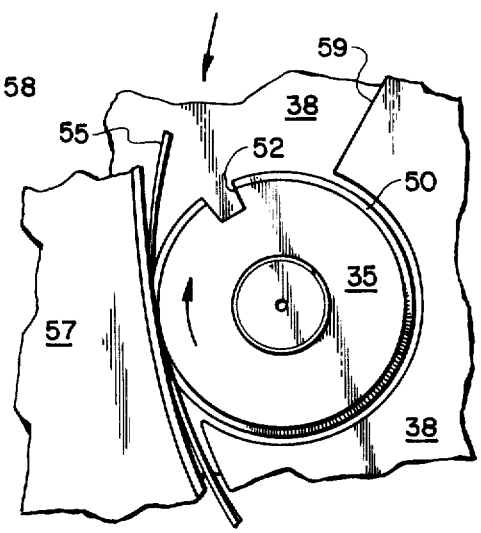
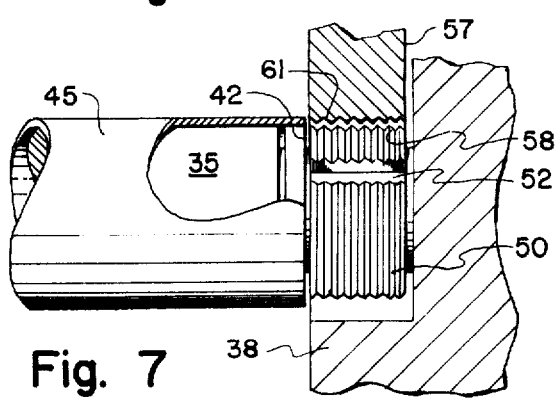

METHOD AND APPARATUS FOR TRIMMING CYLINDRICAL ARTICLES

BACKGROUND OF THE INVENTION

1. Field of the Invention

The present invention relates generally to apparatus and method for trimming cylindrical articles, and more particularly to apparatus and method for longitudinally trimming can bodies to a predetermined length and efficiently disposing of the waste portion trimmed at high speeds.

2. Description of the Prior Art

A number of devices and methods for trimming excess material from cylindrical articles, and particularly from two piece can bodies formed by a drawing and wall ironing process are known. Conventionally, aluminum or steel cans are formed by flowing the metal in the wall of the can until the can wall thickness is quite thin. This produces an uneven end and excessive length which requires that the excess material be accurately trimmed from the open end of the can body. Of course trimming per se is a simple severing operation. However, as a result of can lines operating at rates in excess of 600 to 800 cans per minute, problems have been encountered in disposing of the excess material trimmed from the end of the can body. Commonly, this small strip or annulus of material falls into the machinery to jam and even break the mechanism.

Yann U.S. Pat. No. 3,481,232 is an example of an apparatus which, on the surface may appear similar to that of the instant invention, but which, in fact, operates on an entirely different and more complicated principle. The Yann mechanism involves apparatus to push a can axially onto a spindle and thereafter to encounter a fixed arcuate knife blade. However, the spindle and can are of such dimensions as to provide an angular relationship between the spindle and can as it moves onto the spindle. Thus the arcuate knife blade encounters the leading edge of the can and cuts in a spiral manner to remove the excess material. Accordingly, the Yann Process does not sever by shearing an annulus which may be controlled by a portion of the mandrel but instead produces initially a strip of material which is not positively located and accordingly is subject to jamming.

Armbruster et al U.S. Pat. No. 3,400,620 discloses a somewhat similar diagonal cutting trimmer apparatus which provides strips rather than annular scrap portions. Further, the Armbruster et al apparatus utilizes retractable knife blades which are mechanically extended and retracted at various portions of the operation. Thus a very complicated cutting arrangement is involved.

Windstrup U.S. Pat. No. 3,548,769 discusses a carriage mechanism in which the tubular members are carried to individual work stations at which specific processes are accomplished. Among the work stations are an axially reciprocal trimmer which engages and trims the can. However, in view of the indexing and work station approach disclosed by Windstrup, high speed operation is not readily obtained with an apparatus of this type.

Maytag U.S. Pat. No. 3,425,251 and Larkin et al U.S. Pat. No. 3,838,653 disclose somewhat similar devices for trimming can bodies. In both cases, the cans are engaged on a rotating mandrel. However, trimming is accomplished by a rotating knife blade which engages the mandrel and requires, for instance, an expandable mandrel in one instance, the critical alignment and spacing in the other instance. In both instances, the knife is carried on a rotating tool holder and interfaces with a rotating cutting edge on the mandrel thereby introducing requirements for timing and spacing between the two in a dynamic fashion. Further, these devices both use a knurling tool mounted adjacent the rotating knife blade to engage, break and knurl the severed ring. No positive location provision is made to handle the knurled strip once it is ejected from the knurling tool. The knurled strip merely falls away.

SUMMARY OF THE INVENTION

The present invention, which provides heretofore unavailable improvements in apparatus and method for trimming cylindrical articles such as can bodies, comprises an apparatus utilizing a fixed trimmer blade which cooperates with a surface on a mandrel supporting and rotating the cylindrical article. The cutting devices cleanly shear the waste portion in the form of a ring which is then cut into an open configuration, contained in a particularly located scrap chamber adjacent and moving with the mandrel, and positively carried to a scrap collection point. In the event malleable material, such as aluminum, is used to form the cylindrical article, the scrap strip is corrugated longitudinally to straighten the open annulus into a more linear strip which can be more conveniently contained in the scrap chamber.

Accordingly, an object of the present invention is to provide a new and improved apparatus and method for shearing from a cylindrical article waste material beyond a predetermined longitudinal length.

Another object of the present invention is to provide a new and improved apparatus and method for high speed trimming of can bodies in a reliable and simple manner.

Yet another object of the present invention is to provide a new and improved apparatus and method for trimming can bodies in which the major cutting surface is fixed and produces a shearing action.

Still another object of the present invention is to provide a new and improved apparatus and method for severing waste material from can bodies in which the severed material is positively contained within a chamber to prevent the severed waste material from jamming the apparatus.

Still yet another object of the present invention is to provide a new and improved apparatus and method for trimming can bodies in which the severed material may be corrugated to provide a rigid, more easily handled waste strip which may be positively engaged in a scrap chamber for transport.

A further object of the present invention is to provide a new and improved apparatus and method for trimming can bodies in which the trimming is accomplished with essentially no relative movement at the point of severance between the can body and the cutters.

These and other objects and features of the present invention will become apparent from the following descriptions.

BRIEF DESCRIPTION OF THE DRAWING

In the Drawing

FIG. 1 is an exploded, perspective view of the more substantial elements of a trimming apparatus according to the instant invention;

FIG. 2 is a partially sectioned end view of an apparatus in accord with the instant invention;

FIG. 3 is an enlarged, partial view of the mandrel and splitting blade shown in FIG. 2;

FIG. 5 is an enlarged partially sectioned view of the cutting surfaces shown in FIG. 2;

FIG. 6 is a detailed end view of the rolling components of the trimming apparatus; and FIG. 7 is an enlarged, partially cutaway section of the corrugating surfaces shown in FIG. 4.

DETAILED DESCRIPTION OF THE INVENTION

Figure 4:
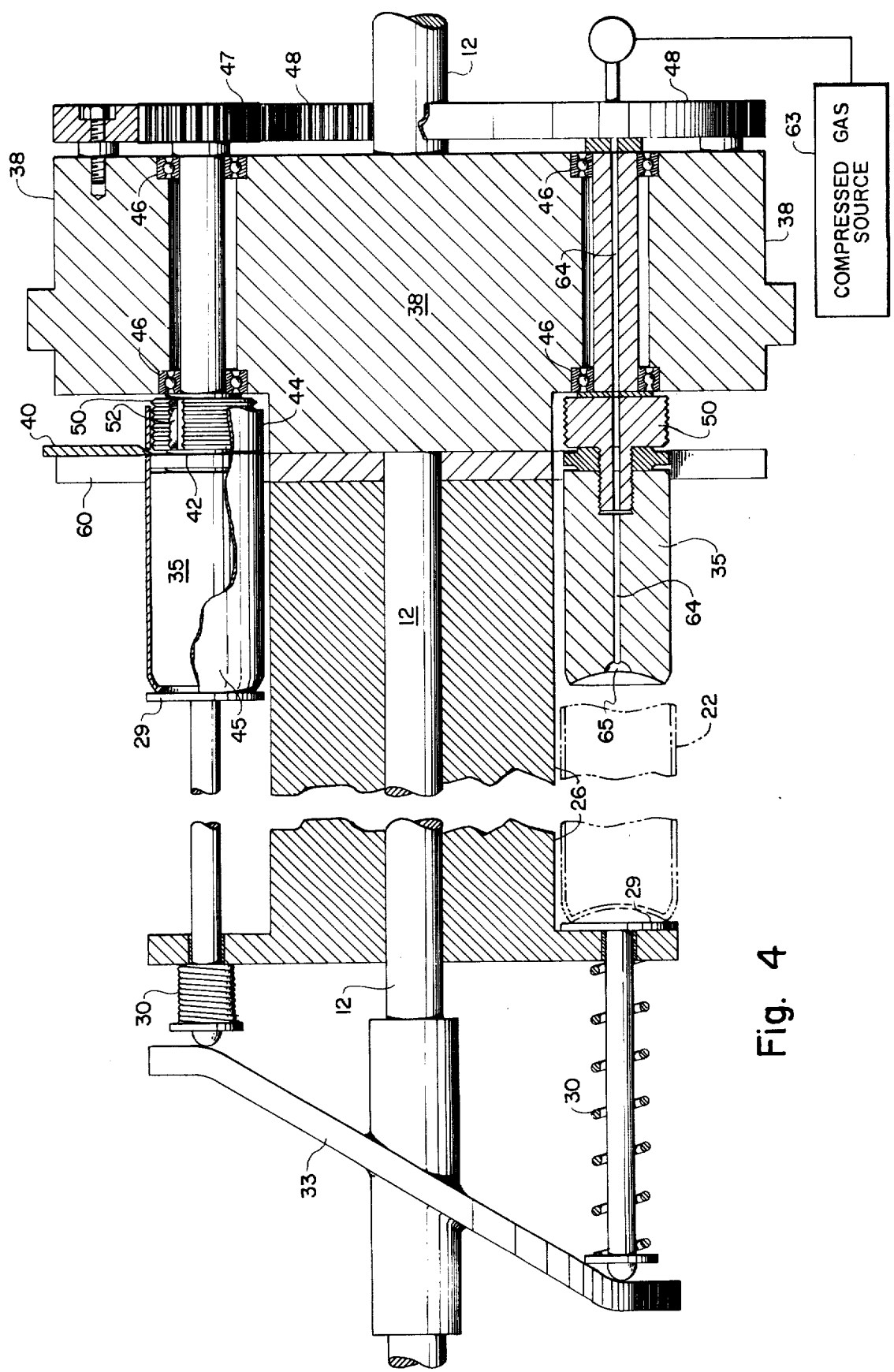
FIG. 4 is a sectioned view along section line IV—IV of FIG. 1.

Turning now to the drawings, wherein like components are designated by like reference numerals throughout the various figures, an apparatus for trimming cylindrical articles to a desired longitudinal dimension is illustrated in FIG. 1 and generally designated by reference numeral 10. Trimming apparatus 10 includes a main shift 12, which is directly or indirectly powered by a source (not shown) and drives main shaft gear 14. Main shaft gear 14, through gears 15 and 16, in turn drive star wheel gear 17 secured to star wheel shaft 18. Thus star wheel 20 is rotated in the opposite direction as main shaft 12 and supplies untrimmed cans 22 carried in star wheel pockets 24, and also contained by guiderails 25, to carriage wheel 26 having carriage wheel pockets 27 defined therein to receive cans 22 from star wheel 20. Star wheel 20 is merely illustrative of the many feed mechanisms which may be employed to provide cans 22 to carriage wheel 26. Numerous other mechanisms would of course also serve this well known purpose. My pending Letters Patent Application Serial Number 605,683 describes a particularly advantageous design for synchronously supplying cylindrical articles.

Plungers 29 are axially aligned with carriage wheel pockets 27 and biased to a retracted position by springs 30. Shafts 31 extending from plungers 29 ride upon cam 33 and thus move plungers 29 into and out of carriage wheel pockets 27 as carriage wheel 26 rotates. Rails 34 maintain cans 22 in carriage wheel pockets 27 immediately after placement therein. Plungers 29 axially displace cans 22 onto mandrels 35 carried on mandrel wheel 38, which in turn is carried on and rotated around main shaft 12. Cans displaced from carriage pockets 27 are urged on to axially aligned mandrels 35 and held thereon by plunger 29 as shown in FIG. 4. As mandrels 35 rotate around main shaft 12, the upper portions thereof contact fixed arcuate knife 40.

As shown in more detail in FIG. 5, arcuate knife 40 engages circular cutting member 42 which forms a portion of mandrel 35. Thus arcuate knife 40 and circular cutting member 42 shear an annulus 44 from untrimmed can 22 to form a trimmed can 45.

As shown in FIG. 4, mandrels 35 are journalled in mandrel wheel 38 by bearings 46 and carry pinion gears 47 at the end thereof. Pinion gears 47 are of a diameter substantially equal to that of can 22 and engage ring gear 48 which is driven by main shaft 12. Ring gear 48 thus drives pinion gear 47 to induce a rotation around the axis of mandrel 45 which provides contact between arcuate knife 40 and circular cutting member 42 without substantial periphery relative motion therebetween. Accordingly, can 22 severed by a shearing action between arcuate knife 40 and circular cutting member 42 rather than a cutting action involving relative movements between the cutting members.

As shown in FIGS. 2 and 5, and in more detail in FIG. 3, after shearing, annulus 44 is carried on circular support 50 which is the portion of mandrel 35 adjacent circular cutting member 42. Defined longitudinally along the surface of circular support 50 is cutting edge 52 which engages fixed splitting blade 53. Thus, as apparatus 10 operates, rotation of mandrel wheel 38 brings cutting edge 52 into contact with splitting blade 53 and cuts annulus 44 from a closed ring configuration to an open ring configuration to form waste strip 55. Further incremental rotation of mandrel 35 and circular support 50 brings circular support 50 into contact with support shoe 57. Again, because of the relative sizes of pinion gear 47 and ring gear 48 relative to the placement of mandrels 35, circular support 50 moves along fixed support shoe 57 with a true rolling motion. This motion tends to roll waste strip 55 from a circular configuration to a straightened, elongated strip configuration. However, in some instances, as shown in FIG. 7, it is desirable to provide circumferential grooves 58 on circular support 50 with corresponding grooves 61 on shoe 57. This provides a corrugating effect in waste strip 55 and thus tends to straighten waste strip 55 from the circular configuration to a linear configuration as shown in FIG. 6.

As shown in FIGS. 2 and 6, waste strip 55 is rolled between circular support 50 and shoe 57 to provide a linear strip which is received in waste strip chamber 59 located adjacent circular support 50 and defined in mandrel wheel 38. As shown in FIG. 1, waste strip chamber 59 is closed by plate 60 to provide for positive containment of waste strip 55 until, as shown in FIG. 2, it is desired to eject waste strip 55 into waste strip collector opening 62. Thus, as a result of the initial formation of annulus 44 around circular support 50, a pinching rolling of waste strip 55 between circular support 50 and shoe 57, and, finally, containment within waste strip chamber 59, waste strip 55 is not permitted to merely fall away but is positively located to prevent undesirable interference with the operation of trimming apparatus 10.

As shown in FIG. 4, after annulus 44 is severed by the shearing action between arcuate knife 40 and circular cutting member 42 to form trimmed can 45, plunger 29 rides down cam 33 to permit spring 30 to retract plunger 29 from the positioning urging trimmed 45 onto mandrel 35. At that time, compressed air from a source 63 is provided through channel 64 to opening 65 at the end of the mandrel 35. Thus, a positive air pressure is provided inside trimmed can 45 urging trimmed can 45 away from mandrel 35 into carriage pocket 24. At a location adjacent trimmed can collector 68, trimmed can 45 is freed of pocket 24 and conducted into trimmed can collector 68, as shown in FIG. 2, for further processing.

Summarily, apparatus 10 receives untrimmed cans 22 in carriage wheel pockets 27. Cans 22 are pushed by plungers 29 onto mandrel 35 and held there by plungers 29. As carriage wheel 26 rotates, circular cutting member 42 positioned inside of can 22 engages fixed arcuate knife 40 thereby shearing in annulus 44 from can 22 to produce a trimmed can 45. Initially, the annulus 44 is supported on circular support 50. Further progression of the apparatus 10 causes splitting blade 53 to synchronously engage cutting edge 52 defined on the surface of circular support 50 to cut open annulus 44 thereby forming waste strip 55. As circular support 50 continues to roll it engages shoe 57 which rolls waste strip 55 between circular support 50 and shoe 57 and, in a preferred embodiment, corrugates longitudinally waste strip 55 to form a linear configuration of waste strip 55. When the length of waste strip 55 has been rolled between circular support 50 and shoe 57, it is ejected and contained within waste strip chamber 59 defined in carriage wheel 26. Only when waste strip chamber 59 is adjacent waste strip opening 62 is waste strip 55 permitted to fall into a proper and safe collection volume. Thus waste strip 55 is positively contained after severance from can 22 as annulus 44, and also during all stages of formation of the linear waste strip 55 and transport to waste strip opening 62.

Finally, plungers 29 are retracted and trimmed can 45 ejected from mandrel 45 by, for instance, compressed for conveyance to further processing apparatus.

Although only illustrative preferred embodiments of the invention have been presented and discussed, it is anticipated that various changes and modifications will be apparent to those skilled in the art, and that such changes may be readily made without exceeding the scope of the invention as defined by the following claims.

What is claimed is:

1. Apparatus for trimming cylindrical articles to a predetermined length comprising: at least one cylindrical mandrel having an axis and extending from a rotatable mandrel support for rotation around an axis spaced from the axis of the mandrel a greater distance than the mandrel diameter, the mandrel further being journalled to the mandrel support for rotation around its own axis, means for rotating the mandrel and mandrel support around the spaced axis at a given rate and for rotating the mandrel around its own axis with a peripheral velocity speed equal in magnitude and opposite in sense to that produced by rotation around the spaced axis, a circular cutting member defined circumferentially around the mandrel and spaced from an end of the mandrel a distance equal to the desired length of the trimmed cylindrical article, a fixed, arcuate blade positioned adjacent the path of travel of the mandrel to engage the circular cutting member defined around the mandrel, a circular support portion of the mandrel adjacent the cutting edge defined in the mandrel, a cutting edge defined longitudinally in the circular support portion, a fixed splitting blade disposed perpendicular to the arcuate blade and adapted to engage the cutting edge, a support shoe adjacent the splitting blade having an arcuate surface positioned to engage the circular support portion of the mandrel in a rolling motion, a chamber defined in the mandrel support adjacent the circular support portion, means for placing a can onto the mandrel, and means for removing the can from the mandrel whereby an untrimmed cylindrical article may be positioned on and rotated with the mandrel with the circular cutting member defined in the mandrel engaging the fixed arcuate blade to shear an annulus from the article, the fixed splitting blade in conjunction with the cutting edge severing the annulus into a strip and the circular support portion engaging and rolling the strip against the support shoe as the mandrel rotates to deposit the rolled, straight strip in the chamber for conveyance to a depository for the strip, and the trimmed cylindrical article then being removed from the mandrel.

2. Apparatus for trimming cylindrical articles as set forth in claim 1 in which the rotatable mandrel support is a mandrel wheel carried on a main shaft and having a plurality of equally spaced mandrels journalled thereon concentric with the central shaft.

3. Apparatus for trimming cylindrical articles as set forth in claim 2 in which a ring gear is attached to the main shaft and each mandrel carries on the journalled portion thereof a pinion gear of a diameter substantially that of the mandrel and engaging the ring gear, the ring gear and pinion gear comprising the means for rotating the mandrel around its own axis.

4. Apparatus for trimming cylindrical articles as set forth in claim 1 in which the splitting blade is positioned between the arcuate blade and the support shoe, and the arcuate, splitting blade and support shoe are adjacent and positioned substantially within a circle concentric with the spaced axis.

5. Apparatus for trimming cylindrical articles as set forth in claim 2 in which the means for placing a can on a mandrel comprise a carriage wheel having a plurality of pockets defined in the periphery thereof, the carriage wheel being mounted to the main shaft with each pocket in the carriage wheel aligned with a mandrel, and further including plungers one each aligned with each pocket defined in the mandrel with means for axially reciprocating the plungers to displace the can positioned in the carriage wheel pocket from the carriage wheel pocket onto an axially aligned mandrel.

6. Apparatus for trimming cylindrical articles as set forth in claim 5 in which the means to reciprocate the plungers comprise a cam surface upon which the plungers ride and springs biasing the plungers into contact with the cam.

7. Apparatus for trimming cylindrical articles as set forth in claim 5 in which means are provided to synchronously supply cans to the carriage wheel pockets as the carriage wheel pockets rotate past the means to supply cans.

8. Apparatus for trimming cylindrical articles as set forth in claim 5 in which a plate is provided adjacent the mandrel wheel to enclose the chambers defined in the mandrel wheel, said plate having defined therein a plurality of circular openings through which the mandrels pass.

9. Apparatus for trimming cylindrical articles as set forth in claim 5 in which the means to remove cans from the mandrels comprise channels defined through the mandrel, an opening connected to the channel at the end of the mandrel, and means for providing a compressed gas through the channel whereby, as the plungers retract from the mandel, compressed gas may be provided through the channel to move the can from the mandrel into the carriage pocket.

10. Apparatus for trimming cylindrical articles as set forth in claim 1 in which the circular support and support shoe have defined in the surfaces thereof a series of circumferential ridges, whereby waste strip rolled between the circular support portion and the support shoe will be corrugated by the ridges.

11. Apparatus for trimming cylindrical articles as set forth in claim 2 in which the chambers for receiving strips are defined in the mandrel wheel adjacent the mandrel in a position trailing the mandrel relative to the direction of rotation of the mandrel wheel, and a circular plate having openings defined therein through which the mandrels extend is positioned against the mandrel wheel to close the chamber on all but the outer portion of the mandrel wheel.

12. Apparatus for trimming cylindrical articles as set forth in claim 11 in which the support shoe extends adjacent the mandrel wheel from the splitting blade to a position adjacent a strip depository, whereby the strip after being rolled between the support shoe and the circular support portion of the walls of the chamber and the support shoe until adjacent the strip depository whereat the strip is released into the strip depository.

13. Apparatus for trimming can bodies to a predetermined length comprising: a carriage wheel carried on a main shaft, the carriage wheel having defined in the periphery thereof a plurality of carriage pockets, means for sequentially and synchronously providing untrimmed cans to the carriage wheel, means synchronously driving the means for providing cans and the main shaft, a plurality of plungers positioned one each in axial alignment with the carriage pocket, means for extending and retracting the plungers through the carriage pocket, a mandrel wheel carried on the main shaft for rotation thereabout and having journalled thereto a plurality of mandrels, each mandrel having defined on the surface thereof a circular cutting member, and a circular support portion of the mandrel between the cutting edge and the mandrel wheel, a plurality of strip chambers defined in the mandrel wheel with one strip chamber being positioned adjacent each mandrel at the circular support portion thereof, an arcuate blade fixedly supported adjacent the mandrel wheel in alignment with the circular cutting member defined in the mandrels, a cutting edge defined longitudinally in the circular support portion of each mandrel, a fixed splitting blade located adjacent one end of the arcuate blade and adapted to engage the cutting edge defined in the circular support portion of each mandrel, a support shoe adjacent the splitting blade fixedly carried adjacent the mandrel wheel and adapted to engage the circular support portion of each mandrel, and means for selectively expelling a can from the mandrel, whereby cans may be provided to the carriage wheel pocket, moved axially by the plunger from the carriage wheel pocket onto a mandrel, the undesired portion of the can sheared from the can be coaction of the arcuate blade and the circular cutting member defined around the mandrel to form an annulus, the annulus thus sheared from the can being split by the coaction of the splitting blade and the cutting edge defined on the circular support member into a strip material, the thus formed strip material being rolled between the support shoe and the circular support portion of the mandrel to form a substantially linear strip, and the strip being ejected into the waste strip chamber and carried to a desired depository.

14. Apparatus for trimming cans as set forth in claim 13 in which the circular support portion of the mandrel and the support shoe each have defined in the surfaces thereof a plurality of ridges, whereby the rolling motion of the circular support portion of the mandrel against the support shoe will corrugate the strip being rolled thereby tending to linearly straighten the strip.

15. Apparatus for trimming cans as set forth in claim 13 in which a ring gear is carried on the main shaft adjacent the mandrel wheel and each mandrel has attached thereto a pinion gear of substantially the same diameter as the mandrel which is engaged with the ring gear.

16. Apparatus for trimming cans as set forth in claim 13 in which each mandrel has defined therethrough a channel in communication with means for providing compressed air, whereby cans may be expelled from the mandrel by means of compressed air conducted through the channel.

17. A method for trimming cylindrical articles to a predetermined length comprising: positioning a cylindrical article on a mandrel, moving the mandrel through a circular path, rotating the mandrel around its own axis with a peripheral rate equal to but opposite in direction to the peripheral velocity of the circular path, shearing an annulus from the cylindrical article by contacting a circular cutting member on the mandrel with an arcuate fixed blade adjacent the circular path, supporting the annulus on a circular support portion of the mandrel, cutting the annulus into an open ring configuration by contacting a fixed splitting blade adjacent the circular path with a longitudinal cutting edge on the circular support portion of the mandrel, rolling the open ring between the circular support portion and a fixed support shoe mounted adjacent the circular path to straighten the open ring into an elongated strip, ejecting the elongated strip from the circular support portion of the mandrel into a chamber adjacent to and traveling with the mandrel, carrying the strip in the chamber to a depository for the strip, ejecting the strip from the chamber into the depository.

18. A method for trimming cylindrical articles as set forth in claim 16 in which the open ring is corrugated during rolling between the circular support portion of the mandrel and the support shoe by means of grooves defined on the surfaces of the circular support member and the shoe.

19. A method for trimming cylindrical articles as set forth in claim 17 in which the cylindrical articles are supplied by initially sequentially feeding the articles into carriage wheel pockets defined in a carriage wheel rotating with the mandrel through the circular path, and then axially displacing the cylindrical article from a pocket onto a mandrel for trimming.

20. A method for trimming cylindrical articles as set forth in claim 19 in which the cylindrical article is axially removed from the mandrel into the carriage wheel pocket after trimming.

21. A method for trimming can bodies comprising: sequentially and synchronously feeding can bodies into pockets formed in a carriage wheel, rotating the carriage wheel around a central axis, axially displacing the can bodies from each carriage wheel pocket onto a journalled mandrel rotating around the central axis in alignment with the carriage wheel pocket, shearing an annulus from the can body by means of a circular cutting member defined on the mandrel and a fixed arcuate blade adjacent the path of travel of the mandrel, supporting the annulus on a circular support portion of the mandrel, cutting the annulus into an open ring configuration by contacting a longitudinal cutting edge defined on the circular support portion of the mandrel with a fixed splitting blade positioned adjacent the path of travel of the mandrel, straightening the open ring into a substantially linear strip by rolling the open ring between the circulr support member portion of the mandrel and a support shoe adjacent the path of travel of the circular support member portion of the mandrel, ejecting the straightened strip into a chamber defined adjacent the circular support portion of the mandrel, carrying the strip to a depository in the chamber, ejecting the strip from the chamber into a depository for the strip, ejecting the can axially from the mandrel into the aligned carriage wheel pocket, and removing the trimmed can from the carriage wheel pocket for further processing.

22. A method for trimming can bodies as set forth in claim 21 in which the straightened strip is corrugated by grooves defined in the surfaces of the circular support member portion of the mandrel and the support shoe.

* * * * *